United States Patent
Wedam et al.

(10) Patent No.: US 10,638,874 B2
(45) Date of Patent: May 5, 2020

(54) THERMAL BLOCK FOR HEATING LIQUIDS

(71) Applicant: I.R.C.A. S.P.A. INDUSTRIA RESISTENZE CORAZZATE E AFFINI, San Vendemiano (IT)

(72) Inventors: Stefano Wedam, Mareno di Piave (IT); Federico Zoppas, Treviso (IT)

(73) Assignee: I.R.C.A. S.P.A. INDUSTRIA RESISTENZE CORAZZATE E AFFINI, San Vendemiano (IT)

( * ) Notice: Subject to any disclaimer, the term of this patent is extended or adjusted under 35 U.S.C. 154(b) by 631 days.

(21) Appl. No.: 15/039,119

(22) PCT Filed: Nov. 25, 2014

(86) PCT No.: PCT/IB2014/066314
§ 371 (c)(1),
(2) Date: May 25, 2016

(87) PCT Pub. No.: WO2015/079379
PCT Pub. Date: Jun. 4, 2015

(65) Prior Publication Data
US 2017/0172341 A1    Jun. 22, 2017

(30) Foreign Application Priority Data
Nov. 26, 2013   (IT) ............................. PD2013A0321

(51) Int. Cl.
*A47J 31/54*     (2006.01)
*F24H 1/10*      (2006.01)

(52) U.S. Cl.
CPC ................... *A47J 31/542* (2013.01)

(58) Field of Classification Search
CPC .............................. A47J 31/543; F24H 1/102
See application file for complete search history.

(56) References Cited

U.S. PATENT DOCUMENTS

| | | | |
|---|---|---|---|
| 4,310,747 A * | 1/1982 | Rice ...................... | F24H 3/0405 126/561 |
| 4,546,697 A | 10/1985 | Schaeffer | |
| 4,821,682 A * | 4/1989 | Waters ...................... | F24H 1/18 122/169 |

(Continued)

FOREIGN PATENT DOCUMENTS

| | | |
|---|---|---|
| CN | 2650056 Y | 10/2004 |
| CN | 201926359 U | 8/2011 |

(Continued)

OTHER PUBLICATIONS

International Search Report & Written Opinion for PCT/IB2014/066314; dated Mar. 19, 2015.

*Primary Examiner* — Dana Ross
*Assistant Examiner* — Lawrence H Samuels
(74) *Attorney, Agent, or Firm* — Abelman, Frayne & Schwab

(57) ABSTRACT

A thermal block (100) for heating a liquid, comprises: —a tube (200) for the passage of liquid, provided with an inlet (3) and an outlet (4) and with at least one segment (200) with corrugated walls (6), —a massive block (1) co-molded outside said pipe (200) so that the inlet (3) and the outlet (4) are outside the massive block (1), —one resistive element (5) for heating the massive block (1).

8 Claims, 7 Drawing Sheets

(56) References Cited

U.S. PATENT DOCUMENTS

| | | | | |
|---|---|---|---|---|
| 6,044,837 A * | 4/2000 | Tyler | .................. | F24H 3/065 |
| | | | | 122/250 R |
| 6,782,195 B2 * | 8/2004 | Abras | .................. | F24H 1/162 |
| | | | | 165/148 |
| 6,912,357 B2 * | 6/2005 | Bissonnette | .................. | B05B 1/24 |
| | | | | 137/341 |
| 7,106,957 B2 * | 9/2006 | Abras | .................. | F24H 1/162 |
| | | | | 392/465 |
| 9,254,059 B2 * | 2/2016 | Berto | .................. | A47J 31/542 |
| 9,347,682 B2 * | 5/2016 | Etter | .................. | F24H 1/162 |
| 2003/0141381 A1 * | 7/2003 | Bissonnette | .................. | B05B 1/24 |
| | | | | 239/132 |
| 2003/0188539 A1 * | 10/2003 | Abras | .................. | F24H 1/162 |
| | | | | 62/3.3 |
| 2004/0258403 A1 * | 12/2004 | Abras | .................. | F24H 1/162 |
| | | | | 392/480 |
| 2005/0047768 A1 * | 3/2005 | Kuebler | .................. | B60S 1/488 |
| | | | | 392/493 |
| 2008/0271608 A1 * | 11/2008 | Morin | .................. | A47J 31/542 |
| | | | | 99/294 |
| 2010/0199853 A1 | 8/2010 | Blanc | | |
| 2011/0041705 A1 * | 2/2011 | Reichl | .................. | A47J 31/542 |
| | | | | 99/323.3 |
| 2011/0168028 A1 * | 7/2011 | Aardenburg | .................. | A47J 31/542 |
| | | | | 99/288 |
| 2011/0174160 A1 * | 7/2011 | Blanc | .................. | A47J 31/542 |
| | | | | 99/288 |
| 2011/0240267 A1 | 10/2011 | Blanc | | |
| 2013/0055902 A1 * | 3/2013 | Berto | .................. | A47J 31/542 |
| | | | | 99/281 |
| 2013/0064529 A1 * | 3/2013 | Etter | .................. | F24H 1/162 |
| | | | | 392/482 |
| 2013/0264037 A1 * | 10/2013 | Otsubo | .................. | F28D 7/085 |
| | | | | 165/157 |
| 2014/0233931 A1 * | 8/2014 | Capraro | .................. | A47J 31/542 |
| | | | | 392/488 |

FOREIGN PATENT DOCUMENTS

| | | |
|---|---|---|
| DE | 3119630 A1 | 12/1982 |
| EP | 1532905 A1 | 5/2005 |

\* cited by examiner

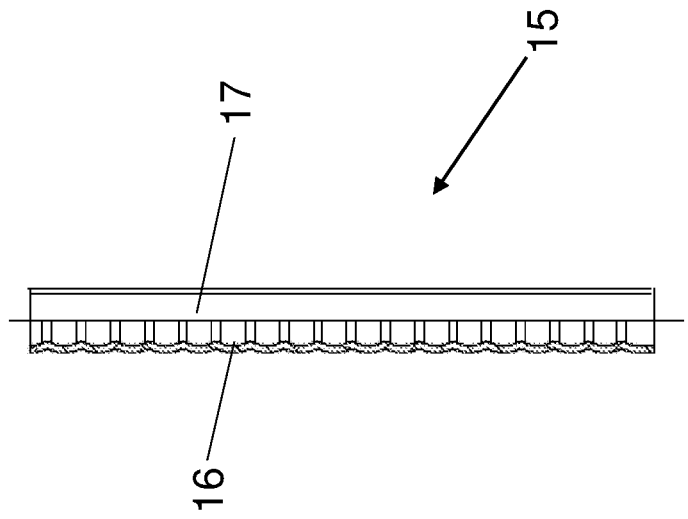
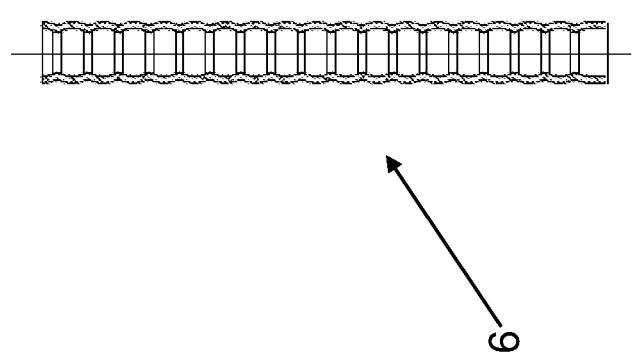

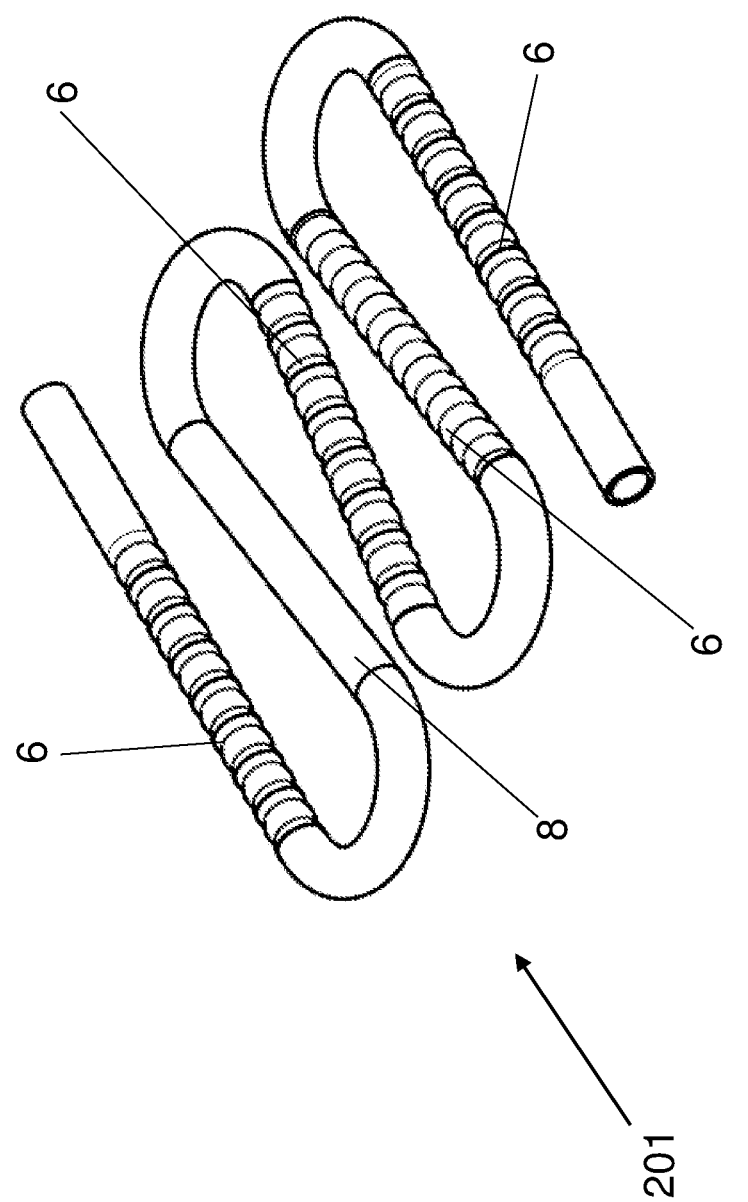

THERMAL BLOCK FOR HEATING LIQUIDS

CROSS REFERENCE TO RELATED APPLICATIONS

This application is a national phase of PCT application No. PCT/IB2014/066314, filed Nov. 25, 2014, which claims priority to IT patent application No. PD2013A000321, filed Nov. 26, 2013, all of which are incorporated herein by reference thereto.

FIELD OF THE INVENTION

The present invention relates to a thermal block for heating liquids.

BACKGROUND ART

In many home appliance applications, in particular in small-sized appliances, for example, but not exclusively, espresso coffee makers, it is essential for a given amount of water to be available at an optimal temperature and for the water temperature to remain constant when dispensing the finished product, e.g. coffee.

Furthermore, given the home and thus occasional use, the water must be heated rapidly in order to reduce the times required for dispensing the finished product and the interval of time between two subsequent dispensing operations. In order to satisfy such specifications, it would be necessary to maintain the heating member at a predetermined temperature; however this would imply an energy consumption which is considered unacceptable. In order to limit such a consumption, an automatic switch-off system is normally provided, which intervenes to switch off the home appliance if it is not used for a predetermined time. This is obviously in contrast with the need to reduce the water heating time because the waiting time will be necessarily longer when the appliance is switched on again.

The use of a particular type of heat exchanger, named thermal block, is also known in order to attempt to solve the above-described drawbacks. In a thermal block, the water flows within a serpentine immersed in a massive metal block made of high heat capacity and high heat conducting material so as to accumulate a large amount of thermal energy which may be efficiently transferred to the water circulating in the serpentine. A thermal block has the further advantage of allowing to heat small amounts of water, e.g. the amount needed to obtain a single dose of coffee. However, there are a plurality of drawbacks even when a thermal block is used, including operating temperature instability and excessive heating time, e.g. longer than two minutes in the case of a coffee maker. The need to improve this device further in order to make it more compliant to market demands thus arises.

SUMMARY OF THE INVENTION

It is an object of the present invention to provide a thermal block capable of ensuring a stable operating temperature with short heating time, in all cases compatible with the specific market demands.

It is a further object of the invention to provide a thermal block in which there is an appropriate remixing of the liquid to be heated, so as to increase the heating of the liquid.

Such objects are achieved by a thermal block for heating a liquid which, according to claim 1, comprises:

a tube for the passage of said liquid, provided with a wall, an inlet and an outlet, a massive block consisting of a mass of heat-conducting material, at least one resistive element for heating said massive block, wherein the tube is arranged in the thermal block so that the wall thereof is immersed in and separate from said mass, and so that said inlet and outlet are outside the massive block, and wherein the tube has at least one corrugated segment with inner surface irregularities, whereby the heat exchange between the massive block and the liquid is increased.

The thermal block of the present invention allows the heat exchange surface to be increased per length unit, thus improving the heat exchange between the massive block and the liquid. In particular, a turbulence is generated in the flow of liquid to be heated by virtue of the inner surface irregularities of the at least one corrugated segment, which are in contact with the liquid thus causing a remixing thereof and an improved heating. Advantageously, there is provided the possibility of varying the length of the at least one corrugated segment with respect to the total length of the tube for the passage of water, which allows to vary the thermal power exchanged as a function of the specific intended application. When several corrugated segments are provided, the exchanged thermal power can be appropriately modulated as a function of the specific application by appropriately varying the number of smooth segments and corrugated segments of the tube. Moreover, the dissipated thermal power can be increased in some zones and decreased in others in a selective manner by appropriately varying the mutual position of the corrugated segments and of the smooth segments. When over the length of the tube one or more corrugated segments are alternated with one or more smooth segments, the highest heat exchange will occur at the corrugated segment(s). However, the turbulence generated in the liquid by the corrugation can have remixing effects even in the smooth segments. Advantageously, the high heat exchange areas can be selected by varying the number of corrugated segments. The corrugated segments have inner transversal irregularities with respect to the longitudinal axis of the tube, and thus to the flowing direction of the liquid, and preferably the inner irregularities are orthogonal to the longitudinal axis of the tube. Furthermore, the irregularities can be made over the whole perimeter of a section, for example a section orthogonal to the longitudinal axis of the tube or over a part of such a perimeter. For example, if the tube has a circular orthogonal section, each irregularity can be substantially circle-shaped or substantially shaped as a circumferential arc.

The inner surface irregularities can be inner protrusions. Furthermore, outer surface irregularities can be included, e.g. external protrusions, the inner wall of which is in contact with the liquid.

Advantageously, the tube can be deformed to obtain the corrugation before it is incorporated in the massive block since the tube is a distinct element, immersed in the massive block. Thereby, the tube may be deformed in a simple, rapid manner, e.g. by applying a pressure on the outer wall thereof via appropriate means. Thereby, the inner irregularities can be further made so as to have complex geometric shapes, e.g. helixes, spirals or other. The number of corrugated segments, the shape of the irregularities and the shape of the tube can thus be easily varied as needed. Moreover, a tube folded on itself can be used so that the path of the tube is developed on two or more superimposed planes. For example, a tube shaped as a meander serpentine folded on itself at approximately half its length can be used or a tube folded on itself so as to have one portion with one or more superimposed windings, being either circular or elliptical, and in which the inlet and the outlet of the tube lay on different planes, preferably parallel to one another, can be used. The tube preferably comprises at least two curved segments.

A further advantage is in that the massive block and the tube can be made of different materials. For example, the massive block can be made of aluminum, which has excellent heat conductivity and the tube may be made of stainless steel, because it has good wear resistance, in particular corrosion resistance, and is suitable for contact with food grade liquids.

Preferably, the total length of the tube is greater than 400 mm, for example from 500 to 1500 mm.

Preferably, the outer diameter of the tube is from 4 to 16 mm, the extreme values being included.

Other advantages can be obtained by means of a thermal block made in accordance with the dependent claims. In particular, the possibility of using a corrugated lining sheath for the resistive element allows to improve the heat exchange between the latter and the massive block.

According to a further aspect, the invention provides a process for manufacturing a thermal block having the features in claim 1, where there are provided a tube having at least one corrugated segment with inner surface irregularities, at least one resistive element, a mass of heat-conducting material, heating means adapted to melt said mass of heat-conducting material, injection means and a mold, said process comprising the steps of:

arranging the tube inside the mold,
arranging the at least one resistive element inside the mold,
melting the mass of heat-conducting material via the heating means so as to obtain a molten mass,
injecting the molten mass into the mold via the injection means, so that the molten mass surrounds the tube and the at least one resistive element,
cooling the molten mass to ambient temperature.

The molding technique can be, for example, die-casting, low-pressure shell molding, earth/sand casting, loss-wax casting or other.

According to a variant, the resistive element is immersed in the massive block by insertion with interference in a recess obtained in the massive block after the molding operation.

It is apparent that the massive block and the tube can have any shape without departing from scope of the present invention.

The present invention is particularly, but not exclusively suited for use on small home appliances, e.g. home coffee makers.

BRIEF DESCRIPTION OF THE DRAWINGS

Further features and advantages of the present invention will be more apparent in the light of the detailed description of preferred, but not exclusive, embodiments of a thermal block for heating liquids according to the present invention, shown by the way of non-limitative example, with the aid of the accompanying drawings, in which:

FIG. 2a shows a longitudinal section of a portion of the component in FIG. 1;

FIG. 2b shows a longitudinal section of a portion of a component which can be used in a thermal block according to a variant of the invention;

FIG. 3 shows an axonometric view of a component according to a variant of the first embodiment;

The same reference numerals refer to the same components or to components having the same functional and/or structural features.

DETAILED DESCRIPTION OF THE INVENTION

Figure 1:
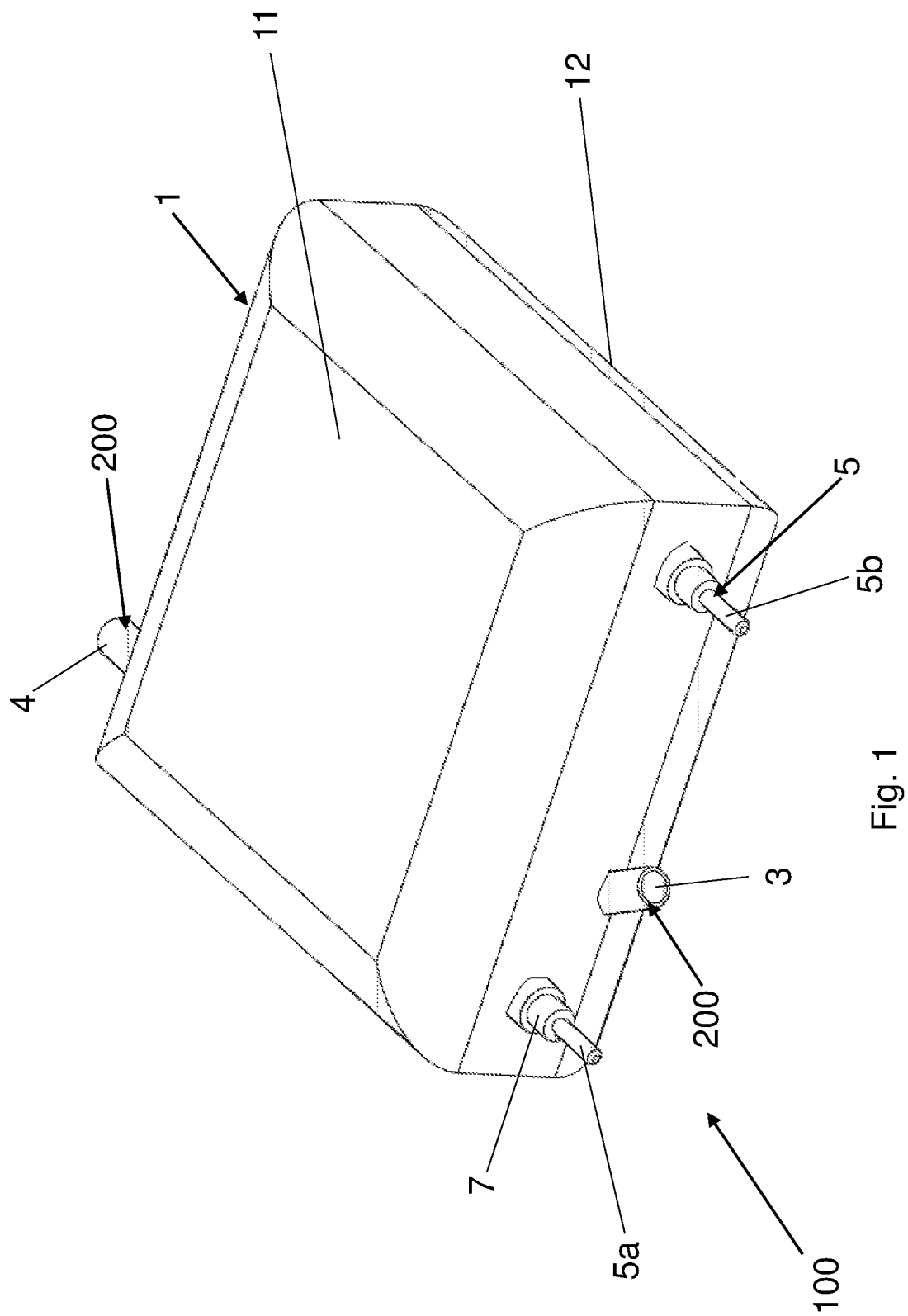
FIG. 1 shows an axonometric view of a first embodiment of a thermal block according to the present invention.

With reference to figures from 1 to 3, according to a first embodiment, a thermal block for heating a liquid, in particular water, in a home appliance is indicated as a whole by reference numeral 100.

The thermal block is generally shaped as a parallelepiped. The thermal block 100 comprises a tube 200 for the passage of water to be heated. Tube 200 is provided with an inlet 3 for the water at low temperature to be heated and an outlet 4 for the heated water. Being crossed by water for human consumption, the tube 200 is made of stainless steel. The thermal block 100 comprises a massive block 1 co-molded outside tube 200, so that the inlet 3 and the outlet 4 of tube 200 are outside the massive block 1. The massive block 1 consists of a mass of material capable of ensuring high thermal capacity, so as to accumulate the thermal energy which must be transmitted to the water, and with high thermal conductivity so as to transfer the thermal energy accumulated in the massive block 1 to the water circulating in tube 200. The material for manufacturing the massive block 1 is aluminum also because this material is particularly adapted to be molded. However, any other material with similar features can be used for the purposes of the present invention for manufacturing the massive block and the tube. Since the thermal capacity also depends on mass, the massive block is also conveniently dimensioned to ensure the required thermal capacity.

Any molding technique can be used, such as die-casting, low-pressure shell molding, earth/sand casting, loss-wax casting or other.

The thermal block 100 comprises a resistive element 5 for heating the massive block 1 due to the passage of current. The resistive element 5 is also joined to the massive block 1 by co-molding and is provided with two ends 5a, 5b protruding with respect to massive block 1. The resistive element 5 comprises a lining sheath 7. According to a variant of the present invention (not shown), such a lining is corrugated so as to increase the heat exchange surface per length unit, thus improving the heat exchange between the resistive element 5 and the massive block 1.

Tube 200 is folded on itself and comprises a portion having a plurality of straight segments and a plurality of curved segments. In other words, the tube comprises a meander serpentine, the path of which is developed on two superimposed planes. More in detail, tube 200 comprises a first meander portion 200a including inlet 3 and a second meander portion 200b including outlet 4 and arranged in series with respect to said first portion 200a. The straight segments 6 are corrugated with inward protrusions. In particular, each protrusion is circular and extends over the whole perimeter of the section orthogonal to the tube, i.e. the section orthogonal to the flowing direction of the liquid. Irregularities of the outer surface of the tube correspond to the inner protrusions. By virtue of the inner protrusions, a turbulence is generated in the liquid flow, so as to cause a remixing of the liquid itself and thus increase the heat exchange between the massive block 1 and tube 200 and between the latter and the water which flows therein. The curved segments instead are substantially smooth, as well as the two segments of tube close to inlet 3 and outlet 4. FIG. 2*b* shows a variant of corrugation of the tube according to the invention, in which segment 15 has a part 16 in which each protrusion is substantially shaped as a circumferential arc, extending over a portion of the perimeter of the orthogonal section of the tube, i.e. the section orthogonal to the flowing direction of the liquid, while another part 17 of segment 15 is smooth.

The massive block 1 is substantially shaped as a parallelepiped with two opposite and parallel end bases 11, 12, upper and lower ends respectively, more extended than the other faces of the parallelepiped. The two meander portions 200*a*, 200*b* lay on two respective superimposed planes placed close to the lower base 12 and close to the upper base 11 of the massive block 1, respectively, and an inclined transition portion is present therebetween. Inlet 3 and outlet 4 are placed, with respect to the massive block 1, at two respective faces which are mutually opposite and substantially orthogonal to the bases. Such a pattern of tube 200 makes a considerable development in length possible in addition to supplying a heating chamber with the desired volume capacity and high heat exchange surface.

Figure 2:
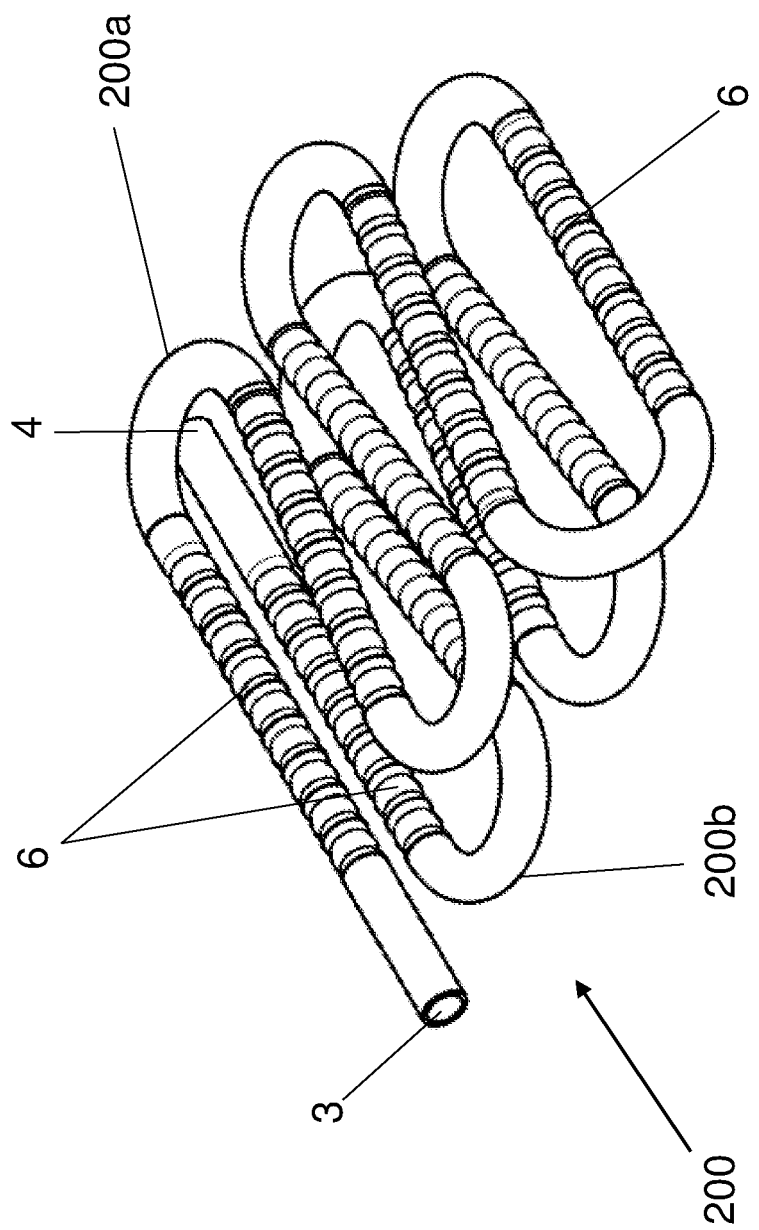
FIG. 2 shows an axonometric view of a component which can be used in the thermal block in FIG. 1.

According to a variant of the first embodiment, shown in FIG. 3, alternatively to that shown in FIG. 2, tube 201 is of the meander type, lying on a single plane also comprising inlet 3 and outlet 4, in which a single rectlinear segment 8 has smooth walls, while the other straight segments 6 have a corrugated surface. Also in this case, the two segments of tube close to inlet 3 and outlet 4 have smooth walls.

Figure 4:
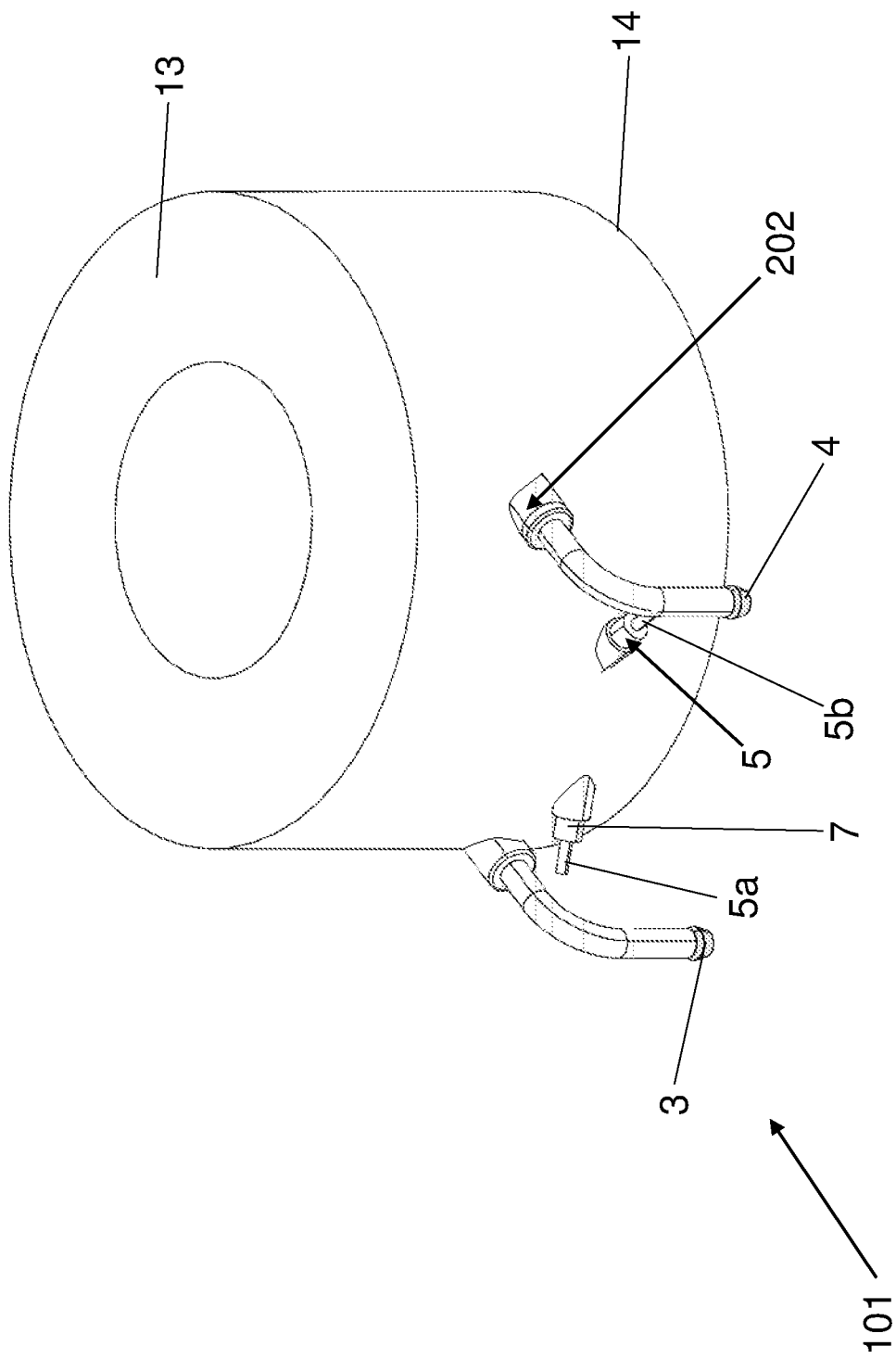
FIG. 4 shows an axonometric view of a second embodiment of a thermal block according to the present invention.
Figure 5:
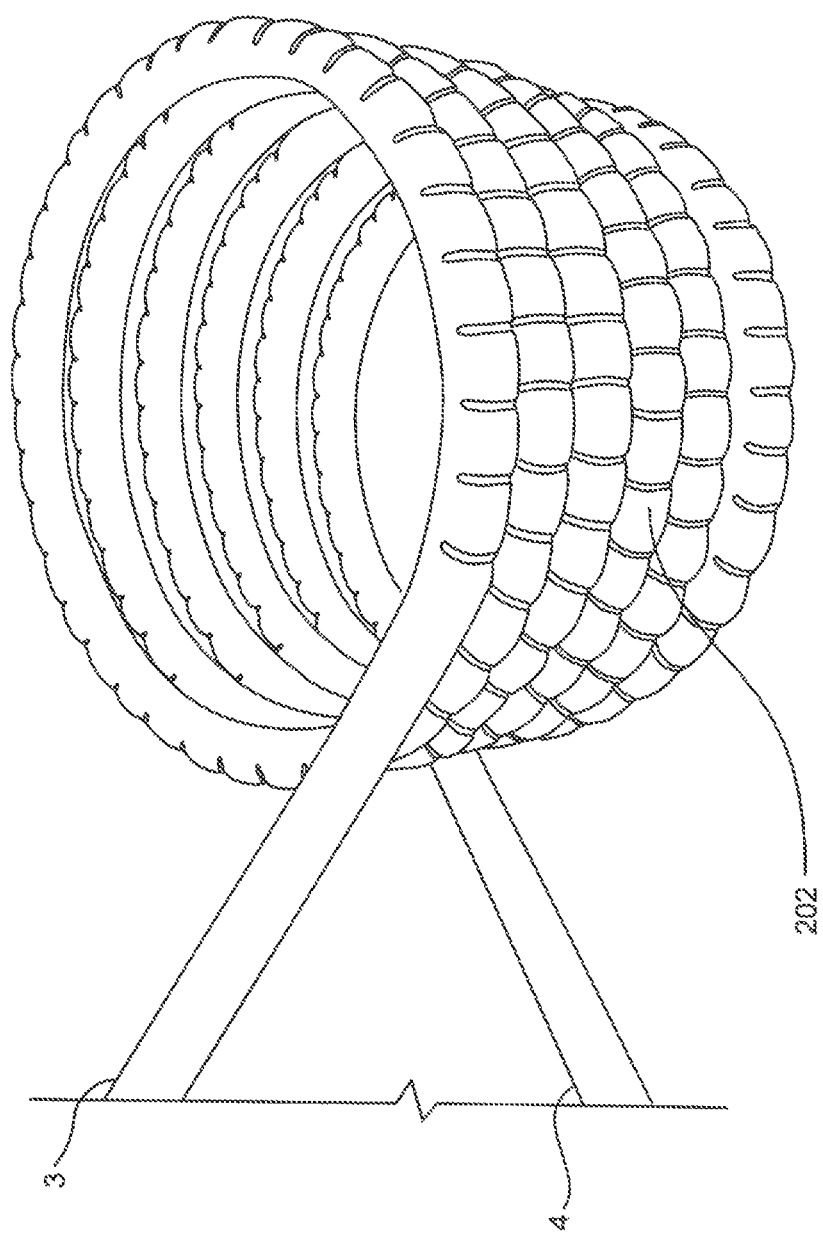
FIG. 5 shows an axonometric view of a component which can be used in the thermal block in FIG. 4.

With reference to FIGS. 4 and 5, in the second embodiment, a thermal block for heating a liquid, in particular water, in a home appliance is shown as a whole by reference numeral 101 and has the same features as the thermal block 100 of the first embodiment except for those described below.

The massive block 1 is substantially cylindrical in shape with two circular bases 13, 14, upper and lower bases, respectively. A portion of tube 202 is folded on itself according to a cylindrical spiral with inlet 3 and outlet 4 placed at opposite ends of the spiral.

Figure 5A:
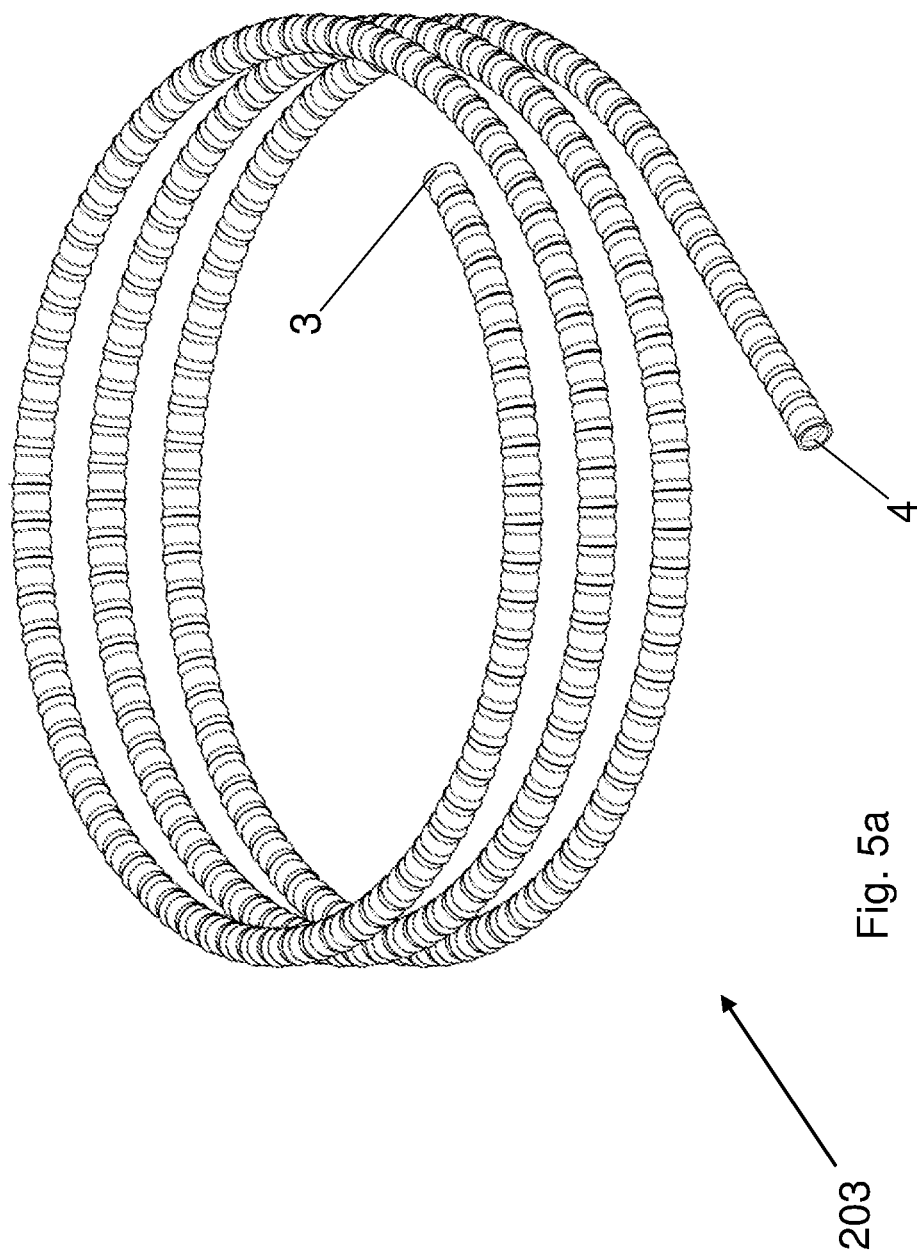
FIG. 5a shows a variant of the component in FIG. 5.

Tube 202 is completely corrugated with inner protrusions except for two portions close to inlet 3 and outlet 4. Each protrusion extends over a portion of the perimeter of the section orthogonal to the longitudinal axis of the tube, i.e. in orthogonal direction with respect to the flowing direction of the liquid. According to a variant of the second embodiment, shown in FIG. 5*a*, tube 203 is completely corrugated with surface irregularities over the whole perimeter of the tube section orthogonal to the flowing direction of the fluid. When tube 203 is inserted into the massive block, the inlet 3 and outlet 4 are outside the massive block. According to a further variant of the second embodiment (not shown), a spiral segment is provided with mutually alternating corrugated segments and smooth segments, so as to conveniently modulate the thermal power exchanged as a function of the specific application.

The invention thus achieved the object illustrated above while obtaining a plurality of advantages. In particular, the surface corrugation of the tube with respect to the traditional smooth pipe solution allows to:
- increase the turbulence of the fluid within the pipe itself and thus increase the convective heat exchange coefficient as well;
- shorten the length of the pipe, thus simplifying its shape and decreasing the overall sizes and thus the cost of the thermal block due to the increase of the heat exchange power per length unit;
- accept a higher amount of lime scale—per length unit of the tube—due to the presence of inner pockets caused by the corrugation;
- reduce the deposit of lime scale due to the turbulence increase inside the pipe.

The invention claimed is:

1. A thermal block for heating water in a home appliance, comprising:
   a tube for the passage of said water, provided with a wall, an inlet and an outlet,
   a massive block consisting of a mass of heat-conducting material,
   at least one resistive element for heating said massive block,
   wherein the tube is arranged in the thermal block so that the wall thereof is immersed in and separate from said mass, and so that said inlet and outlet are outside the massive block,
   wherein the massive block is molded outside the tube,
   wherein the massive block is made of aluminum,
   wherein the tube is made of stainless steel,
   and wherein the tube has at least one corrugated segment with inner surface irregularities,
   whereby the heat exchange between the massive block and the water is increased, wherein said thermal block has parallelepiped dimensions with two end bases which are greater in size than the other dimensions of the parallelepiped, and wherein the tube comprises a meander serpentine, the path of which is mainly developed on two superimposed planes placed close to a respective end base of said two end bases.

2. The thermal block according to claim 1, wherein each inner surface irregularity of said inner surface irregularities extends over the whole perimeter of the orthogonal section of the tube or over at least one portion of said perimeter.

3. The thermal block according to claim 1, wherein said tube consists of a meander serpentine.

4. The thermal block according to claim 1, wherein the tube is corrugated over the whole length thereof.

5. The thermal block according to claim 1, wherein said thermal block and said tube have mainly cylindrical dimensions.

6. The thermal block according to claim 1, wherein said resistive element comprises a corrugated sheath so as to optimize the heat exchange between said massive block and said resistive element.

7. The thermal block according to claim 1, wherein the home appliance is a coffee maker.

8. A process for manufacturing a thermal block having the features set forth in claim 1, wherein there are provided a tube having at least one corrugated segment with inner surface irregularities, at least one resistive element, a mass of heat-conducting material, heating means adapted to melt said mass of heat-conducting material, injection means and a mold, said process comprising the steps of:
   arranging the tube inside the mold,
   arranging the at least one resistive element in the mold, melting the mass of heat-conducting material via the heating means so as to obtain a molten mass, injecting the molten mass into the mold via the injection means, so that the molten mass surrounds the tube and the at least one resistive element, cooling the molten mass to ambient temperature.

* * * * *